June 26, 1962
W. A. McCLUSKEY
3,040,680
SOIL FEEDER
Filed July 6, 1961
2 Sheets-Sheet 1
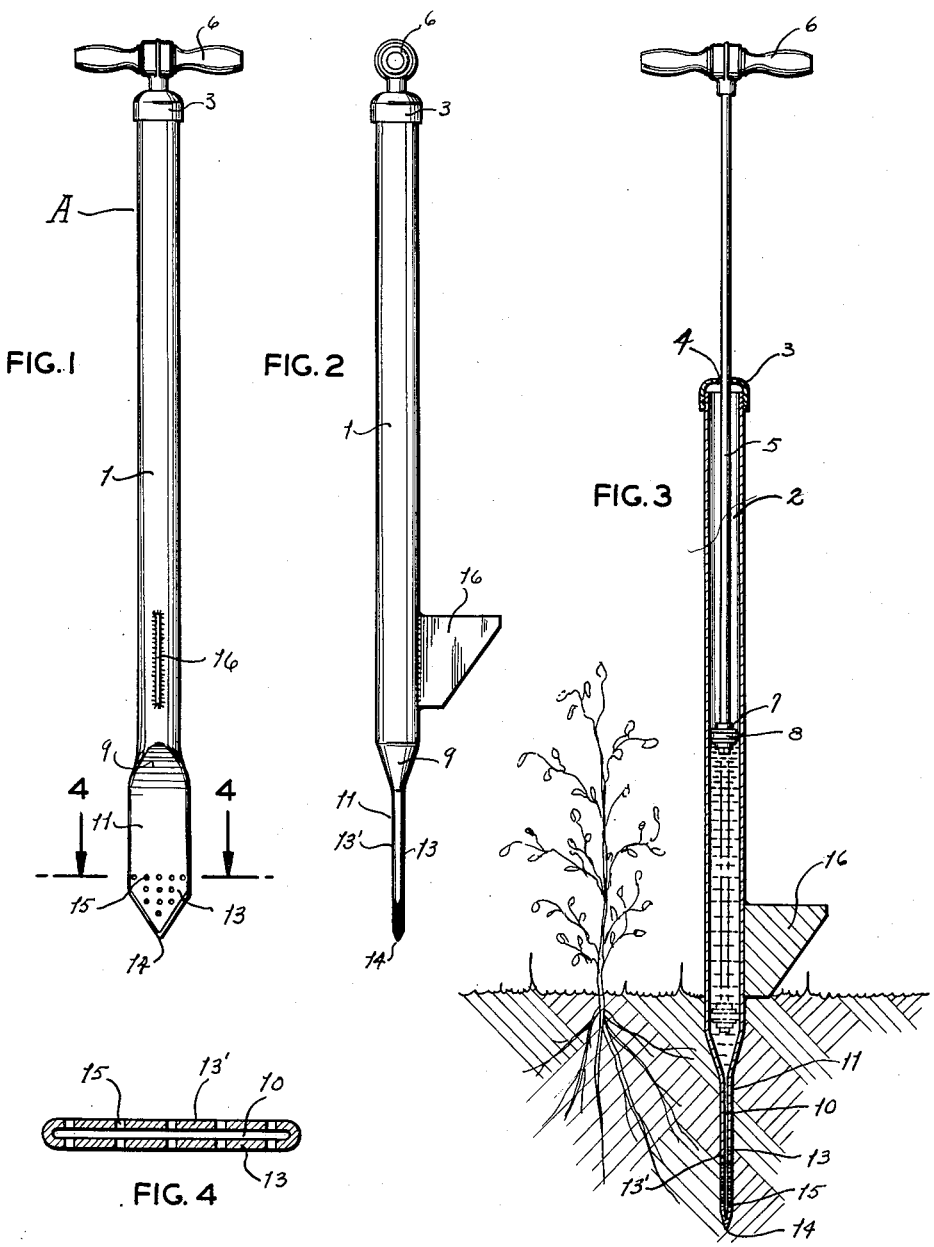
INVENTOR.
WILLIAM A. McCLUSKEY
BY Ralph W. Kalish
ATTORNEY June 26, 1962 W. A. McCLUSKEY 3,040,680
SOIL FEEDER
Filed July 6, 1961 2 Sheets-Sheet 2
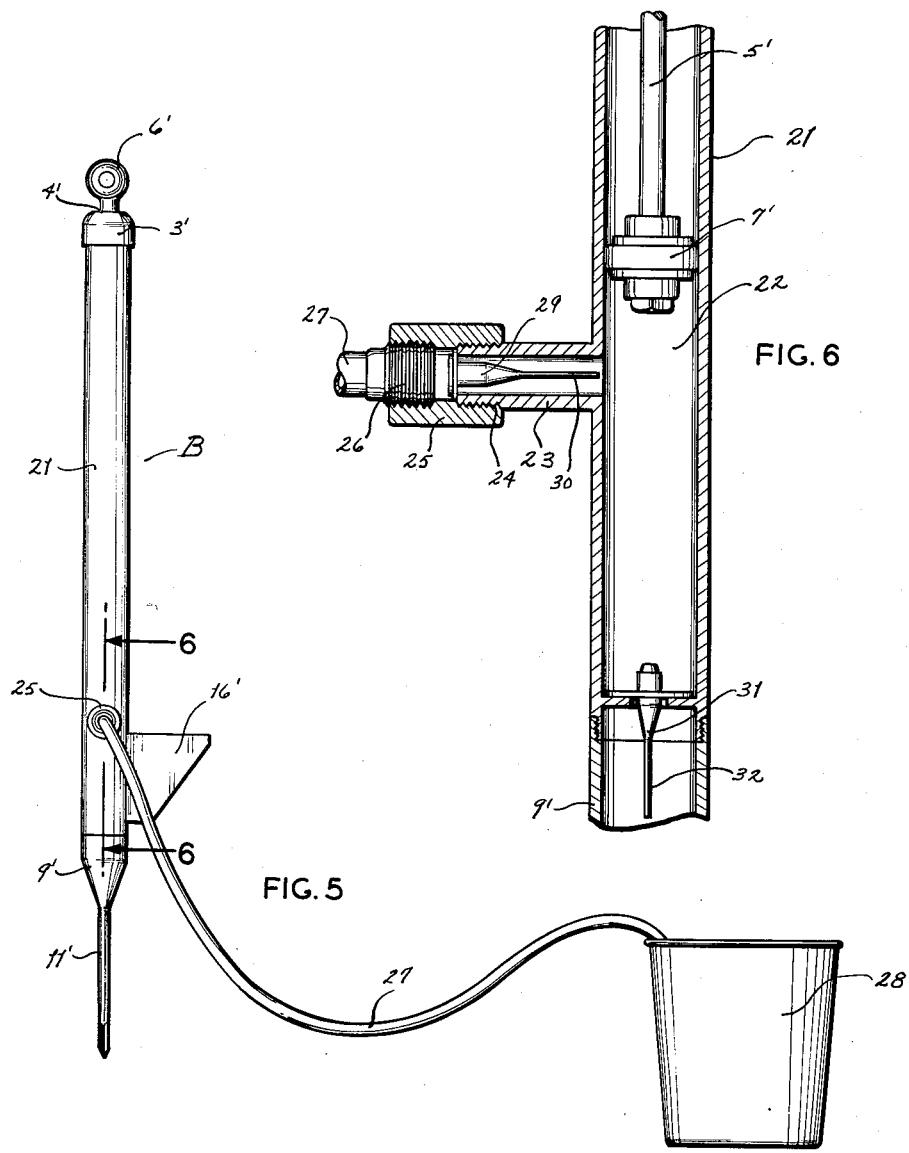
INVENTOR.
WILLIAM A. McCLUSKEY
BY
ATTORNEY

3,040,680
SOIL FEEDER
William A. McCluskey, 5439 Holly Hills, St. Louis 9, Mo.
Filed July 6, 1961, Ser. No. 122,248
7 Claims. (Cl. 111—7.4)

It is a principal object of the present invention to provide a soil feeder adapted for facile manipulation and portability, and being designed for ease of soil penetration for presentation of its discharge end adjacent roots to be treated.

It is another object of the present invention to provide a soil feeder adapted for containing a predetermined quantity of a soil treating agent to thereby provide a self-contained unit independent of a supply source.

It is another object of the present invention to provide a soil feeder adapted for connection to a conveniently located supply of a soil feeding agent, and having unique valve means for effecting reception of a predetermined quantity of said agent and for ejecting for soil-treatment purposes.

It is a further object of the present invention to provide a soil feeder which may be most economically produced, having a simplicity of parts and, hence, being resistant to breakdown; which is reliable in usage; and which may be efficiently and effectively handled by an unskilled individual.

Other objects and details of the invention will be apparent from the following description, when read in connection with the accompanying drawings (two sheets) wherein—

FIGURE 1 is a front view of a soil feeder constructed in accordance with and embodying the present invention.

FIGURE 2 is a side elevational view.

FIGURE 3 is a side elevational view with the outer wall being partially broken away and illustrating the feeder in operative relationship to plant roots for treatment thereof.

FIGURE 4 is a horizontal transverse section taken on the line 4—4 of FIGURE 1.

FIGURE 5 is another form of soil feeder constructed in accordance with and embodying the present invention.

FIGURE 6 is a vertical transverse section taken on the line 6—6 of FIGURE 5.

Referring now by reference characters to the drawings which illustrate preferred embodiments of the present invention, A generally designates a soil feeder comprising an elongated cylindrical body, of desired length and diameter, internally providing a chamber 2 defining a reservoir for a predetermined quantity of a liquid soil treatment preparation. Suitably engaged, as by screw threads, on the upper end of body 1, is a closure cap 3 through an opening 4 in which freely passes a piston rod 5; said rod 5 having a handle 6 on its upper, projecting outer end and a head 7 mounted at its lower end. Head 7 incorporates a flexible sealing member 8 for snug, leak-proof abutment with the interior wall of body 1 for effective liquid intake and liquid expulsion, as will be described hereinbelow.

Cylindrical body 1 is tapered or reduced in its lower portion to provide a neck 9 for communication with the shallow, relatively wide liquid-receiving space 10 in a soil-penetrating portion 11 formed at the lower extremity of said feeder A. Said penetrating portion 11 comprises a pair of flat, substantially planar parallel wall sections 13, 13' integrally connected along their side and bottom edges which latter are cooperatively contoured to form a depending point 14 for facile soil entry.

In their lower portions, wall sections 13, 13' are perforated to provide a plurality of spaced-apart apertures or orifices 15 for liquid flow therethrough. Secured, as by welding, or the like, to the outer face of body 1 and projecting laterally outwardly therefrom, and preferably spaced slightly upwardly from neck 9, is a foot rest 16.

In operation, the lower end extremity of feeder A is placed within a container for a source of a soil treating preparation so that the apertures 15 are below the liquid level and the user will thereupon draw upwardly upon handle 6 to raise head 7 and thereby diminish the pressure within reservoir 2 so that liquid will flow from the container through orifices 15 and upwardly with cylindrical body 1. The upward or liquid intake stroke of piston 5 may be continued until reservoir 2 is substantially filled. Upon completion of the filling operation the user will then carry soil feeder A with the piston rod in its extended relationship, to the particular point in a plot to be treated, and thereon direct the pointed lower end of feeder A into the soil with added downward pressure being effected by the application of force upon foot rest 16 with the soil penetrating portion 11 easily and effectively entering the soil and creating an opening through which neck 9 and the adjacent lower portion of body 1 may be received. With the device thus positioned, the user will then force piston rod 5 downwardly thereby causing the contained liquid to be expelled through openings 15 for treatment of the plant roots adjacent thereto. It will be recognized that the flat character of soil penetrating portion 11 adopts same for ease of soil penetration as well as preventing likelihood of damage to any plant roots, which is extremely important. Furthermore, it will be observed that the force applied upon piston rod 5 in its downward or operative stroke will be such as to permit distribution of the emitted liquid throughout the surrounding soil as against merely collecting in a pool.

Soil feeder A may be most economically produced, as it has a marked simplicity of parts. Said invention is extremely light in weight and may be used by the average home gardener without developing any special skills. Furthermore, soil feeder A is designed to serve as an integrated unit in that it may be carried from place to place for treating widely spaced portions of an area without being dependent upon a source of supply of the contained liquid.

It is of course recognized that any type of soil treating agent in liquid form may be used with the present invention so that solutions of all well-recognized soil nutrients, fertilizers, and the like, are equally useful with soil feeder A. Additionally, due to its unusual contouring at its lower end said feeder permits penetration into the soil so as to bring the nourishing liquid to the roots of the plants for effective treatment thereof.

If desired, another form of soil feeder, indicated generally B in FIGURES 5 and 6, which is constructed in accordance with the present invention, may be provided. Said feeder B is adapted for use with a source of supply of a soil feeding preparation. This form of the invention comprises a cylindrical body 21 which internally defines a reservoir 22 and adjacent its lower end incorporates a short, laterally extending tubular branch 23 which is externally threaded at its outer end, as at 24, for engagement to a fitting 25 which is detachably secured to the threaded end 26 of a conduit 27, such as flexible tubing of predescribed length for connection at its other end to a source of supply of a soil treating preparation as may be contained in a pail 28 or other type of receptacle located at a point remote from the area to be treated. Carried on the outer end of branch 23 is a valve 29, preferably of the so-called "lip" character having a passage normally closed by a pair of superimposed flexible lips, as at 30. Mounted at the lower end of said body 21 is a second lip valve 31, the lips 32 of which extend downwardly.

Said body 21 mounts at its upper end a closure cap 3' having an opening 4' through which passes a piston rod 5'; said latter carrying a handle 6' at its upper, outer end and a head 7' at its lower end; said elements being in all respects substantially identical with the corresponding parts of soil feeder A hereinabove described.

At its lower extremity cylindrical body 21 is threadedly engaged to a neck portion 9' which is integral with a flat, soil-penetrating portion 11'; said neck 9' and soil-penetrating portion 11' being substantially identical to the corresponding parts of soil feeder A hereinabove described. Also, soil feeder B is provided with a foot rest 16' projecting laterally from the side wall of body 21 and being fixed thereto.

With reference being made to FIGURE 6, it will be noted that as the user pulls upwardly upon piston rod 5' the pressure within body 21 will be relatively reduced so as to suck fluid from the source of supply 28 through conduit 27 and through lip valve 29 for reception within reservoir 22; the reduction in internal pressure thus permitting lips 30 to be parted under the force of the incoming liquid. After disposing the soil penetrating portion 11' within the soil for treating plant roots, the user will then force piston rod 5 downwardly which force will thereupon exceed the exterior pressure and hence cause lips 30 of valve 29 to be closed and lips 32 of valve 31 to be opened under the applied force so that liquid will then pass from reservoir 22 into the space within soil penetrating portion 11' for expulsion through the openings thereof to treat the adjacent roots.

It will be noted that conduit 27 may be of any suitable length so that soil feeder B may be operated within an area determined by the source 28 as the center and the length of conduit 27 as a radius. Thus, it will be seen that soil feeder B may be constantly replenished from the source of supply in container 28 to permit of the application of substantial quantities of soil treating preparation at a particular location without the necessity of returning to a remote location for refilling and then going back to the area to be treated. The operation of valves 29, 31 permits of effective and reliable filling and expulsion operations without the danger of undesired reverse flow through either one. Said valves 29, 31 are most economically produced and thus conduce to the economy in production of soil feeder B.

It should be understood that changes and modifications in the formation, construction, arrangement, and combination of the several parts of the soil feeder may be made and substituted for these herein shown and described without departing from the nature and principle of my invention.

Having thus described my invention, what I claim and desire to secure by Letters Patent is:

1. A soil feeding instrument comprising a cylindrical body defining a reservoir for a liquid soil treating agent, a piston mounted in said body for axial slideable movement therein, said body at its normally lower end being formed to provide a discharge portion consisting of a pair of flat, planarwise parallel side walls in mutual immediate proximity and being interconnected throughout their side and bottom marginal portions by narrow end wall sections to define a relatively wide, shallow chamber in communication with said reservoir, each of said side walls having a plurality of orifices for liquid discharge.

2. A soil feeding instrument as defined in claim 1 and further characterized by each of said parallel side walls having its lower end margin contoured to form a point for facility of soil penetration.

3. A soil feeding instrument as defined in claim 1 and further characterized by the provision of a diametrally tapering portion at the lower end of said reservoir and between same and the said relatively wide, shallow chamber.

4. A soil feeding instrument as defined in claim 2 and further characterized by the provision of a foot rest fixedly engaged to said body and projecting radially outwardly therefrom.

5. A soil feeding instrument as defined in claim 1 and further characterized by a first valve mounted in said body at the lower end of said reservoir and above said relatively wide, shallow chamber, and a second valve provided about said first valve and laterally thereof, means connecting said body and a source of supply of a liquid soil treating agent, outwardly of said second valve.

6. A soil feeding instrument as defined in claim 1 and further characterized by a short branch pipe extending laterally from, and axially normal to, said body, means connecting said branch pipe with a source of supply of a liquid soil treating agent, a first valve located in said branch pipe for controlling flow of liquid from said source of supply to said reservoir, and a second valve provided in said body below said branch pipe and above said discharge portion for controlling flow of liquid from said reservoir to said discharge end.

7. A soil feeding agent instrument as described in claim 6 and further characterized by said first and second valves being lip valves.

References Cited in the file of this patent
UNITED STATES PATENTS
2,293,090    Wallace _____ Aug. 18, 1942